Nov. 1, 1949.  M. E. GLUHAREFF  2,486,710
RUBBER RIB MOUNTING
Filed April 18, 1946
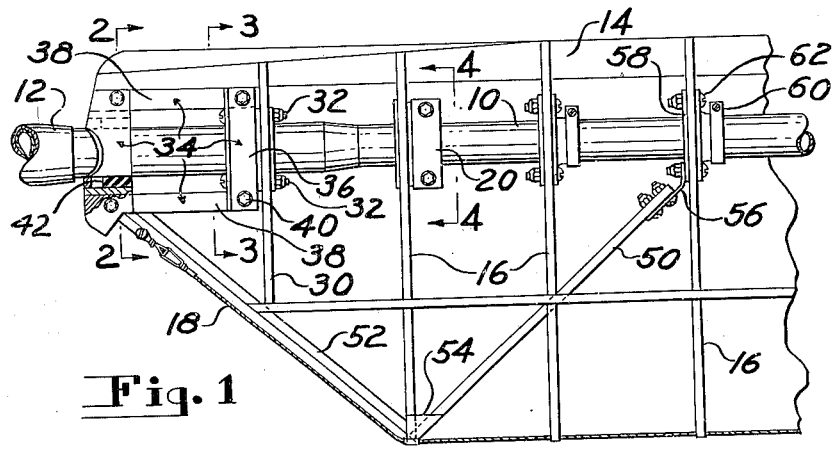
Fig. 1
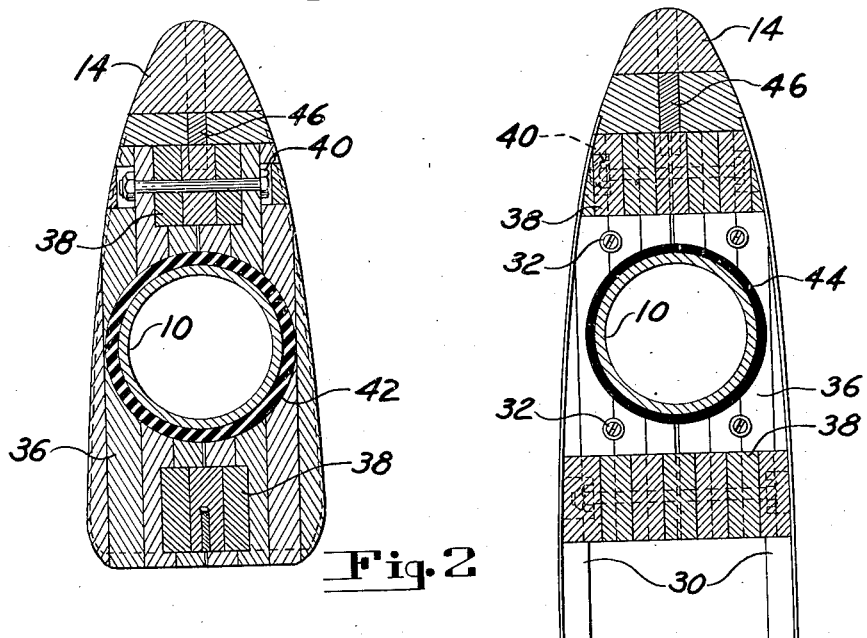
Fig. 2
Fig. 3
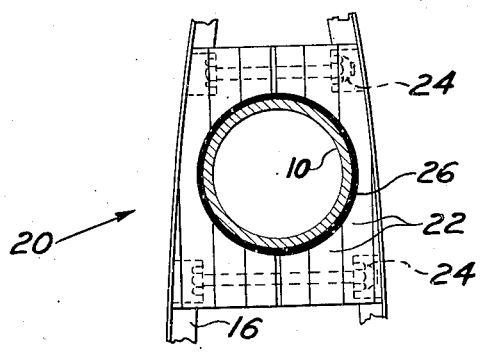
Fig. 4
M. E. GLUHAREFF
INVENTOR
BY *Gifford J. Holmes*
AGENT Patented Nov. 1, 1949

2,486,710

UNITED STATES PATENT OFFICE 2,486,710

RUBBER RIB MOUNTING

Michael E. Gluhareff, Bridgeport, Conn., assignor to United Aircraft Corporation, East Hartford, Conn., a corporation of Delaware Application April 18, 1946, Serial No. 663,209

4 Claims. (Cl. 170—159)

This invention relates to improvements in rotor blades for aircraft of the rotary wing type; and more particularly to improved structure for attaching the root end of the airfoil forming portion of a rotor blade to the longitudinally extending spar that forms the foundation for the blade.

When rotor blades are operated in flight, the action of the air upon the blades during advancing and retreating portions of their cycles with respect to the relative wind causes cyclic stresses within the blade. With presently known blade structure, such stresses tend to concentrate at any point of sharp change of section of the blade. The sharpest change occurs at the point of entry of the spar into the blade proper. At this point, the stress concentration attains a maximum, and the stress reversal force is the largest.

It is an object of this invention to distribute the integrated stress load at the root end of a spar for a rotor blade over a substantial area of the spar by the use of improved root and structure, whereby the tendency of stresses to concentrate in the root at a node is reduced or prevented, and the vibratory attributes of the blade substantially improved thereby.

A further object is to provide a yieldable mount for a rotor blade, comprising compressed rubber, or the like, for securing the root end of the blade proper to the spar, whereby the centrifugal forces acting upon the blade proper stress the rubber in shear in a manner so as to obtain a high degree of damping of vibrations in the spar, at least in the portion thereof supporting the ribs, or to yieldingly transfer portions of stress loadings to or from different parts of the blade structure adjacent the root end thereof, or both.

Another object is to provide an improved rotor blade for helicopters, or the like, having better vibration suppressing or absorbing characteristics than previously known structures, whereby the life of the blade is increased substantially over such structures.

Other objects and advantages lie in the details of construction and arrangement of parts, and will either be obvious or pointed out in the following specification and claims.

In the drawings:

Fig. 1 is a sectional view of the inboard or root end of a rotor blade;

Fig. 2 is a sectional view taken along the line 2—2 of Fig. 1;

Fig. 3 is a sectional view taken along the line 3—3 of Fig. 1; and

Fig. 4 is a sectional view taken along the line 4—4 of Fig. 1.

Referring to Fig. 1, the rotor blade is built upon a spar 10, which spar is secured in a cuff 12. The cuff may be secured to some attachment means for mounting the same to a rotor head and may incorporate one or more hinges to permit movement of the blade due to aerodynamic and other forces acting therein in the flight. For further details of one attachment means, reference may be had to my Patent No. 2,447,118, issued August 17, 1948.

The rotor blade itself is made up of a leading edge 14 that may be of laminated structure as shown in Figs. 2 and 3. The leading edge member is of relatively high density so that the blade is balanced chordwise substantially along the axis of the spar 10. Several ribs 16 are fastened to the leading edge member 14 and to the spar 10 in a manner to be described more fully below, and extend backward and attach to a cable 18 that forms the trailing edge of the rotor blade.

In this invention, the inboard rib 16 is attached to the spar 10 by a clamp 20 made up of a stack of wood laminations 22, which laminations are secured together by bolts 24. The laminations 22 secure a sleeve 26 of natural or synthetic rubber to the spar 10. The sleeve 26 may be of about .032 inch thickness. The bolts 24 may be tightened sufficiently so that centrifugal force acting upon the wing structure through the connections to the clamp 20 will not permit it to move along the spar 10 but will merely stress the sleeve 26 in shear. Also, the sleeve may be cemented or bonded to the laminations 22 and the spar 10 in any known manner.

A short semi-rib 30 is secured by bolts 32 to a box 34. The box 34 is made up of transverse clamp parts or members 36 and spacer parts or members 38 secured together at their ends by bolts 40 to form a framework. The transverse clamping members 36 are formed with a hole to retain sleeves or rings of rubber 42 and 44, or the like, in clamped relationship to the spar 10. The sleeve 44 may be approximately .093 inch thick, and the sleeve 42 about .125 inch thick. The box 34 is secured to the leading edge member 14 by a tongue 46 that may recess in a routed groove in the box 34. The bolts 40 may be drawn up to compress the rubber rings 42 and 44 sufficiently so that centrifugal forces acting upon the wing will not permit movement of the sleeves 42 and 44 with respect to the spar 10 but will merely stress them in shear.

In order to further evenly distribute the centrifugal loading (caused by rotation of the wing) upon the several ribs and the box 34 and the leading edge member 14, and further to prevent vibration stresses from concentrating adjacent the root end of the blade and to permit the spar to vibrate or bend substantially in the manner of a simple cantilever beam, the trailing edge cable 18 is further secured to the inboard end of the wing by a truss arrangement of cross members 50 and 52 which at their apex connect to the inboard rib 16 and are secured thereto by a gusset 54. The truss 50 assumes compression loads and is connected to the second rib out from the inboard rib by means of a connection bracket 56. The bracket 56 is mounted upon a base plate 58 secured to a clamp ring 60 by through bolts 62 which also secure the rib 16 in place. If advantageous or desirable for the particular installation, the clamp 60 may secure a thin rubber sleeve in place in the same manner as described in connection with the clamps 20 and 36. However, these rings may be of substantially less thickness because the bending stresses in the blade tend to concentrate at the sharp change in the contour of the blade where it enters the wing proper.

In operation, the improved blade described herein is subjected to aerodynamic and centrifugal forces and further to variable forces caused by movement of the blade in generally advancing and retracting air during flight which tends to cause oscillations of the blade after the manner of forced vibrations. As the blade vibrates with the improved mount described above, the tendency for the forming of a node of vibration adjacent the root end of the blade is substantially reduced or prevented because the outboard portions of the blade will transfer forces into the inboard ribs and therefrom through the rubber rings before causing forces to be exerted upon the spar. Inasmuch as the rings are stressed in shear because of the centrifugal force and relatively high compression loading, the damping properties will be great and force will be prevented in large part from feeding from the blade to the spar and hence back to the blade. Further, the box 34 at the inboard end distributes what forces are transferred into the blade over a large area adjacent the point of entry of the spar into the blade. Still further, the truss arrangement distributes this load over a substantial portion of the blade at the inboard end.

While I have shown and described one presently preferred embodiment of the invention, obviously other modifications will occur to those skilled in the art. For this reason, I do not wish to be limited to that form shown and described but by the scope of the following claims.

I claim:

1. A helicopter rotor blade comprising a spar, a plurality of chordwise ribs spaced spanwise along said spar, and means for effecting a decrease in the vibratory bending loads in said spar adjacent the root portion of the blade including sleeves of rubber-like material at said rib locations through which said spar threads, a split collar surrounding each sleeve, means for constricting said collars to compress said sleeves against said spar, and means for securing each of said collars to its associated rib.

2. A helicopter rotor blade comprising a spar, a plurality of chordwise ribs spaced spanwise along said spar, and means for effecting a gradual decrease in the vibratory bending loads in said spar adjacent the root portion of the blade including a plurality of sleeves of rubber-like material at said rib locations through which said spar threads, said sleeves being of decreasing resilience from rib to rib outwardly along said spar, a split collar surrounding each sleeve, means for constricting said collars to compress said sleeves against said spar, and means for securing each collar to its associated rib.

3. A helicopter rotor blade comprising a spar, a plurality of chordwise ribs spaced spanwise along said spar, and means for effecting a gradual decrease in the vibratory bending stress in said spar adjacent the root portion of the blade including a plurality of sleeves of rubber-like material through which said spar threads, said sleeves having progressively thinner walls from rib to rib outwardly along said spar for effecting a gradual change of rigidity of the blade structure along its lengths, split collars surrounding said sleeves, clamping means for constricting said collars to clamp said sleeves against said spar, and means for securing each collar to its associated rib.

4. A helicopter rotor blade comprising a spar, a plurality of chordwise ribs spaced spanwise along said spar, a shorter semi-rib inboard of the rib nearest the blade root, a plurality of sleeves of rubber-like material through which said spar threads, split collars surrounding said sleeves at each rib location, means for constricting said collars to clamp said sleeves against said spar, means for securing each of said collars to its associated rib, a frame clamped to said spar inboard of semi-rib comprising two clamping members transverse of said spar and spanwise spacers connecting said clamping members, means for securing said frame to said semi-rib, and a truss structure comprising two angularly related members connected at their apex to the rib next outboard from said semi-rib and having their divergent ends connected respectively to said frame and to a collar on an outboard rib.

MICHAEL E. GLUHAREFF.

REFERENCES CITED

The following references are of record in the file of this patent:

UNITED STATES PATENTS

| Number | Name | Date |
|---|---|---|
| 1,340,154 | Carns | May 18, 1920 |
| 1,779,113 | Carns | Oct. 21, 1930 |
| 1,930,548 | Barbarow | Oct. 17, 1933 |
| 1,950,411 | Larsen | Mar. 13, 1934 |
| 2,272,439 | Stanley | Feb. 10, 1942 |
| 2,400,649 | Larsen | May 21, 1946 |
| 2,465,007 | Bragdon | Mar. 22, 1949 |